Jan. 30, 1968   P. M. BAYON   3,365,756
SAFETY BELT SEPARABLE FASTENER
Filed Feb. 24, 1966   2 Sheets-Sheet 1

Inventor
Patrice Marie Bayon
By Alvin Browdy
Attorney

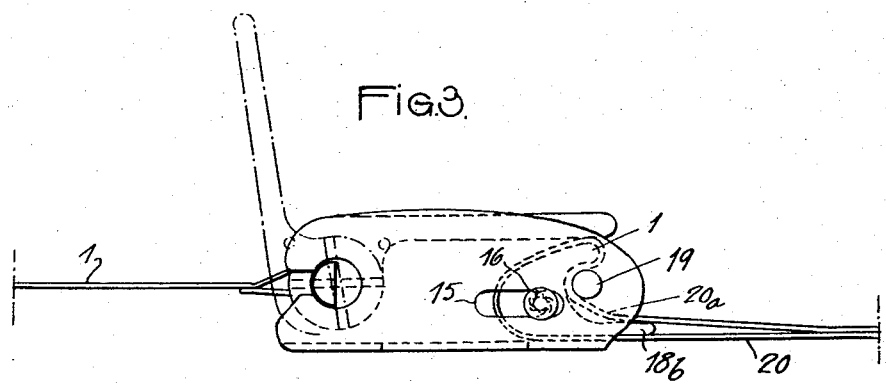
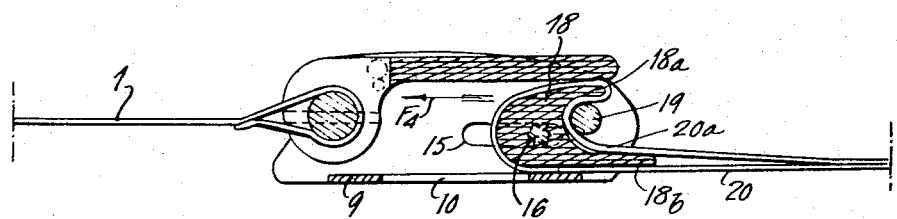
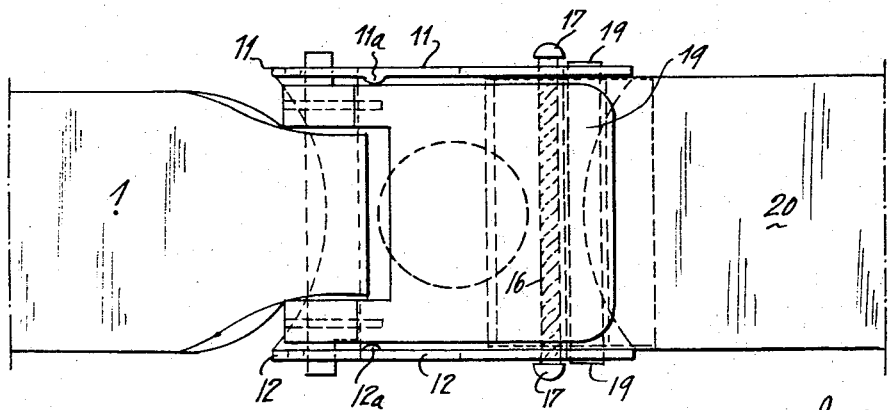

United States Patent Office 3,365,756
Patented Jan. 30, 1968

3,365,756
SAFETY BELT SEPARABLE FASTENER
Patrice M. Bayon, Avrille, France, assignor to L'Aiglon, Angers, Maine-et-Loire, France, a French company
Filed Feb. 24, 1966, Ser. No. 529,783
Claims priority, application France, Mar. 2, 1965, 7,619
3 Claims. (Cl. 24—201)

ABSTRACT OF THE DISCLOSURE

A safety belt including a male member and a female member, the male member being equipped with a spindle having extensions on each side half-cylindrically shaped and in alignment with each other, the extensions being adapted to fit into slots in the female member having an opening with a width equal to half the diameter of the spindle so that the two parts cannot be disengaged without a rotation of the male member of almost 90° and cam means for retaining the two members engaged and preventing unauthorized disengagement.

---

The present invention relates to a safety belt comprising a device for hooking two strands, ensuring, on the one hand, an excellent locking, and on the other, an instantaneous adjustment of the tension of the adjustable strand, without, however, this adjustable strand being able to get out of order in an untimely manner. Thus, considerably increased safety is obtained.

According to the invention, the two strands of the belt, which are fixed by any suitable means, carry, the one, the male locking member integral with an operating handle, the other, the female locking member also comprising a member for adjusting the tension of the strand which can be regulated for length.

According to another characteristic of the invention, the male locking member is formed by a spindle whose two ends project beyond the operating member, being cut according to a diameter so as to form two catches placed in extension of one another.

Various other characteristics of the invention will moreover be revealed by the detailed description which follows.

One form of embodiment of the invention is shown by way of example in the attached drawings.

FIGS. 3, 4 and 5, show in side elevation, longitudinal section and in plan, the member connecting the two strands of the safety belt.

Figure 1:
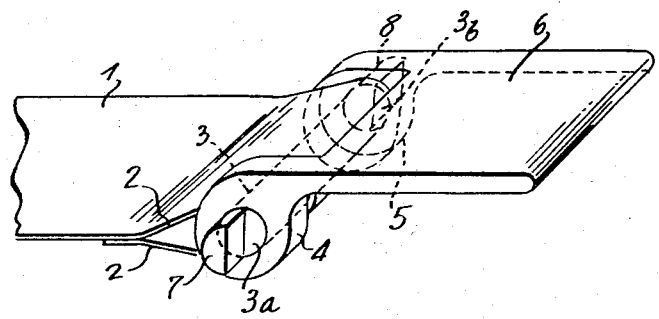
FIG. 1 is a perspective view of the male element of the safety buckle.

In FIG. 1, there is shown the end 1 of one of the strands forming the safety belt. This strand ends in a buckle 2 suitably bent back and sewn so as to be able to pass around a spindle 3 fixed on two wings 4, 5 of a flat shaped operating lever 6. The ends 3a, 3b of the spindle 3 which are flush with wings 4, 5 are so cut that their extensions 7, 8 assume, for instance, the shape of half-cylinders placed in the extension of each other. In certain cases it may be advisable to make polygonal section parts 7 and 8 with rounded corners at the end of the spindle 3. The control lever 6 as well as the two wings 4, 5 are most frequently made of plastic, but could also be provided in any other material, metal, for instance.

Figure 2:
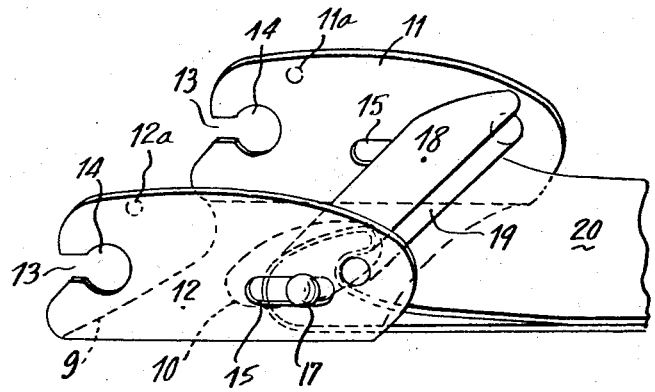
FIG. 2 is a perspective view of the female element of the safety buckle.

In FIG. 2 is shown the female part of the connecting member of the belt which is in the shape of a U-shaped stirrup, whose bottom 9 is drilled with a circular opening 10 for lightening the female part (FIGS. 4 and 5).

In certain cases, the female locking element is made of two flat cheeks connected by rivetted spindles.

The vertical wings 11, 12 of the stirrup 9 each have, near to their front edge, an opening 13 whose width is equal to the half-diameter of the spindle 3, this opening 13 ending in a circular slot 14, whose diameter is equal to the diameter of the spindle 3.

It will be noticed that the wings 11 and 12 each have a horizontal slot 15. A spindle 16, whose ends are each shaped into a round-headed head 17, pass through the slots 15. The spindle 16 is embedded inside a part 18 of appreciably U-shaped section, whose arm 18a is shorter than the arm 18b. Although not shown, the part 18 can directly form projecting nipples for replacing the spindle 16. In such a case, the terminal parts of these nipples extend beyond the wings 11 and 12 and form or comprise abutment members similar to the heads 17. Finally, a spindle 19, placed in the same plane as the hollowed-out part of the part 18, is integral with the rear part of the wings 11, 12 of the female element of the connecting member of the safety belt. The thickness of the part 18 is such that it allows, between it and the bottom of the stirrup 9, the passage of a strip 20 forming the second part of the safety belt, this latter strip being able to be adjusted for length. When this second strip 20 of the belt surrounds the part 18, it passes between the part 18 and the spindle 19, as shown at 20a.

It will easily be understood that when one pulls on the part 20 of the strand forming one of the parts of the safety belt, this movement has the effect of forcing the part 18, by sliding the spindle 16, along the slots 15 against the spindle 19 and thus definitely to lock, the second part of the safety belt at the required length. The adjustment of this length takes place by pushing the part 18 in the direction of the arrow F4 (FIG. 4) to disengage the spindle 19, and thus allow the sliding of the strip of fabric 20 forming the second strand of the safety belt.

When the length of the adjustable strand is correct, the first strand is connected to the second by causing the two extensions 7 and 8 of the male member to enter the openings 13 of the female member. At this moment, the lever 6 is vertical, as shown by dotted lines in FIG. 3, then, when these extensions 7 and 8 are in the slots 14, the lever 6 is turned down to a horizontal position. The extensions 7 and 8 are then secured in the slots 14.

Locking is completed by the fact that the wings 11, 12 have two small bosses 11a, 12a which energetically tighten the lever 6 when it is completely turned down in the horizontal position, as shown in FIG. 4.

When the length of the strand 20 is required to be adjusted, firstly, one can also close the connecting member of the safety belt, then slide the free part of the strand in one direction or the other, so as to obtain a correct adjustment of the belt.

In certain cases, and in place of the small bosses 11a and 12a, the wings 4 and 5 of the operating lever 6 can be given a cam shape, which, when the lever is in a horizontal position on the stirrup, i.e., in the closed position, gives a rigid fixing point that can only be undone by exerting a rather considerable force on this lever 6 to bring it to its vertical position in which the two strands can be separated forming the safety belt.

I claim:
1. A safety belt arrangement including two strands of a belt comprising a male locking member attached to one strand of the belt, said male member having a locking member integral therewith and a spindle extending through said member with said one strand extending around it, an extension on each end of said spindle half cylindrically shaped and in alignment with each other, the flat surface of said half cylindrical extensions being perpendicular to the plane of said locking member, a female locking member adapted to adjustably receive the other strand of the belt, said female locking member having a pair of aligned openings having a diameter approximately equal to the diameter of said spindle and a slot extending from each said opening to the front end of said female member, the width of said slot being approximately equal to one-half of the diameter of said spindle, whereby said male member extensions are adapted to pass thru said slots only when said male member is at approximately 90° to said female member so that after passing thru said slots and into said openings and rotating 90°, the male member is locked to said female member and cannot be removed without first rotating approximately 90°.

2. A safety belt arrangement in accordance with claim 1 wherein cam means are provided between said male and female members to resist counter-rotation of said members after they are in locked position.

3. A safety belt arrangement in accordance with claim 2 wherein said cam means are in the form of projections on each side of same female member adapted to engage opposite sides of said locking member when in the locked position.

References Cited

UNITED STATES PATENTS

| 410,909 | 9/1889 | Martin. | |
|---|---|---|---|
| 1,680,706 | 8/1928 | Tost. | |
| 2,287,308 | 6/1942 | Hill | 24—75 |
| 3,130,467 | 4/1964 | Davis. | |
| 3,193,898 | 7/1965 | Holman | 24—196 |
| 3,293,713 | 12/1966 | Gaylord | 24—196 |

FOREIGN PATENTS

| 1,225,045 | 6/1960 | France. |
|---|---|---|
| 814,957 | 9/1951 | Germany. |

BERNARD A. GELAK, *Primary Examiner.*